(12) United States Patent
Kitamura et al.

(10) Patent No.: US 8,952,117 B2
(45) Date of Patent: Feb. 10, 2015

(54) PROCESS FOR PRODUCING SOLVENT-SOLUBLE REACTIVE POLYSILOXANES

(75) Inventors: Akinori Kitamura, Aichi (JP); Naomasa Furuta, Aichi (JP); Hiroshi Suzuki, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 13/996,828

(22) PCT Filed: Dec. 14, 2011

(86) PCT No.: PCT/JP2011/078907
§ 371 (c)(1),
(2), (4) Date: Sep. 5, 2013

(87) PCT Pub. No.: WO2012/090707
PCT Pub. Date: Jul. 5, 2012

(65) Prior Publication Data
US 2013/0338282 A1    Dec. 19, 2013

(30) Foreign Application Priority Data
Dec. 28, 2010 (JP) ................................ 2010-292006

(51) Int. Cl.
*C08G 77/06* (2006.01)
*C08G 77/20* (2006.01)
*C08K 5/103* (2006.01)

(52) U.S. Cl.
CPC ................ *C08K 5/103* (2013.01); *C08G 77/06* (2013.01); *C08G 77/20* (2013.01)
USPC ................................. 528/10; 528/12; 524/317

(58) Field of Classification Search
None
See application file for complete search history.

(56) References Cited

U.S. PATENT DOCUMENTS

| 4,707,531 | A | 11/1987 | Shirahata |
| 5,110,890 | A | 5/1992 | Butler |
| 8,329,744 | B2 | 12/2012 | Ooike, et al. |
| 2004/0106761 | A1* | 6/2004 | Zha et al. .................. 528/10 |
| 2007/0055034 | A1* | 3/2007 | Tajima et al. ............... 528/12 |
| 2010/0280210 | A1* | 11/2010 | Kitamura et al. ........... 528/31 |
| 2011/0071255 | A1 | 3/2011 | Ooike et al. |
| 2013/0149455 | A1 | 6/2013 | Ooike et al. |

FOREIGN PATENT DOCUMENTS

| JP | 61 195129 | 8/1986 |
| JP | 2 281041 | 11/1990 |
| JP | 6 32903 | 2/1994 |
| WO | 2009 131038 | 10/2009 |

OTHER PUBLICATIONS

International Search Report Issued Apr. 3, 2012 in PCT/JP11/78907 Filed Dec. 14, 2011.
U.S. Appl. No. 13/996,760, filed Jun. 21, 2013, Furuta, et al.

* cited by examiner

*Primary Examiner* — Robert S Loewe
(74) *Attorney, Agent, or Firm* — Oblon, Spivak, McClelland, Maier & Neustadt, L.L.P.

(57) ABSTRACT

The present invention is a method for producing solvent-soluble polysiloxanes which includes a condensation process of subjecting a raw material having siloxane-bond-forming groups to hydrolytic copolycondensation in the presence of a catalyst to synthesize a reactive polysiloxane represented by general formula (1), the raw material containing both an organosilicon compound (S1) having a (meth)acryloyl group and siloxane-bond-forming groups and at least one silicon compound (S2) selected from among tetraalkoxysilanes and tetrahalogenosilanes, wherein in the condensation process, the organosilicon compound (S1) and silicon compound (S2) are used at a (S2)/(S1) molar ratio of 1.8 or less, and the condensation process is conducted by adding gradually a mixture of the silicon compound (S2) and the catalyst to a raw material liquid containing the organosilicon compound (S1) and water, while keeping the molar ratio of the amount of the silicon compound (S2) to the amount of the organosilicon compound (S1) within the range of 0.001/min to 0.3/min.

20 Claims, No Drawings

US 8,952,117 B2

PROCESS FOR PRODUCING SOLVENT-SOLUBLE REACTIVE POLYSILOXANES

FIELD OF THE INVENTION

The invention relates to a method for producing a reactive polysiloxane that is soluble in an organic solvent, and has a (meth)acryloyl group as a reactive functional group. A curable composition containing the reactive polysiloxane leads to a cured film that exhibits excellent heat resistance.

BACKGROUND ART

It is desirable that a chemical material is industrially excellent in storage stability, and does not show a change in form or property even when stored for a long time. In general, a polysiloxane having a reactive functional group such as a (meth)acryloyl group may be partially crosslinked, and may show a decrease in solubility in an organic solvent (or may become insoluble in an organic solvent) during storage singly. When the polysiloxane is stored as a polymer solution, a gel of the polysiloxane may be generated, or an insolubilized component may be precipitated in the solution. In particular, gelation or insolubilization occurs during the polysiloxane production process, and the target product may not be obtained.

Patent Literature 1 discloses a production method of a polysiloxane macromonomer that includes subjecting a reactive functional group containing alkoxysilane (A) such as γ-methacryloxypropyltrimethoxysilane and an alkoxysilane (B) such as tetramethoxysilane to hydrolysis and cocondensation in the presence of a solid catalyst (e.g., cation-exchange resin) that is insoluble in the system using water in a ratio from 70% to 140% by mol with respect to the total number of moles of the alkoxysilane (A) and the alkoxysilane (B). Patent Literature 1 describes that when an alkoxysilane is subjected to hydrolysis and condensation using a catalyst that is dissolved in the system (e.g., hydrochloric acid), hydrolysis and condensation progress with time, the reaction liquid shows an increase in viscosity, gelation is finally occurred, and storage stability is deteriorated.

Patent Literature 1 suggests that the hydrolysis rate differs depending on the type of alkoxysilane, but merely discloses subjecting only two alkoxysilanes (i.e., alkoxysilane (A) and alkoxysilane (B)) to hydrolysis at the same time. In some Example of Patent Literature 1, one of the two alkoxysilanes remains unreacted in an amount of 13% by mass. Specifically, a random cocondensation product may not be obtained, and a component having a high reaction rate may preferentially undergo hydrolysis and condensation when merely subjecting a plurality of alkoxysilanes that differ in reaction rate to hydrolysis and cocondensation in a mixed state. In particular, when the component having a high reaction rate is a tetrafunctional alkoxysilane (e.g., tetramethoxysilane) having a high valency, the condensation product tends to be strongly and three-dimensionally crosslinked. Therefore, a site in which the tetrafunctional alkoxysilane has preferentially reacted is three-dimensionally crosslinked to a large extent, and an increase in viscosity of the reaction mixture, and gelation or insolubilization easily occurs.

Patent Literature 2 discloses a production method of a condensation product that attempts to balance the reaction rates of two alkoxysilanes, and includes adding an organosilicon compound (A1) represented by $R^0(R^1)_n SiY_{3-n}$ (wherein Y is a hydrolyzable group such as an alkoxy group) to a composition obtained by subjecting a tetrafunctional organosilicon compound (B1) represented by $SiX_4$ (wherein X is a siloxane bond-forming group such as an alkoxy group) to an alcohol exchange reaction in 1-propanol, and subjecting the mixture to hydrolysis and copolycondensation under alkaline conditions. Patent Literature 2 states that this production method leads to a smooth progress of hydrolysis and copolycondensation to form an organosilicon compound (C1) as a more stable condensation product, and to a curable composition which is more excellent hardness and stability.

A polysiloxane produced by the process disclosed in Patent Literature 2 shows some difference in stability depending on the conditions.

A reactive polysiloxane has been increasingly used in various applications along with the development of industry, and a process that can more easily produce a more stable polysiloxane has been desired.

PRIOR ART LITERATURE

Patent Literature

Patent Literature 1: JP A H6-32903
Patent Literature 2: WO2009/131038

DISCLOSURE OF THE INVENTION

Problem that the Invention is to Solve

An object of the present invention is to provide an efficient production method of a reactive polysiloxane which has a reactive functional group, exhibits excellent storage stability, and is soluble in an organic solvent, suppressing gelation during condensation process.

Means for Solving the Problem

The present inventors found that when an organosilicon compound having four siloxane bond-forming groups is gradually added to a mixture of water and an organosilicon compound having three siloxane bond-forming groups over a specific time for the production of the reactive polysiloxane represented by the following general formula (1), a reactive polysiloxane can be obtained which is excellent in stability.

The method for producing a solvent-soluble reactive polysiloxane of the present invention includes a condensation process in which a raw material having a siloxane bond-forming group is subjected to hydrolysis and copolycondensation in the presence of a catalyst to synthesize a reactive polysiloxane represented by a general formula (1), the raw material comprising an organosilicon compound (S1) represented by a general formula (5), and at least one silicon compound (S2) selected from a tetraalkoxysilane and a tetrahalogenosilane, and is characterized in that the organosilicon compound (S1) and the silicon compound (S2) are used in the condensation process so that a molar ratio (S2)/(S1) is 1.8 or less, and that the condensation process is conducted while gradually adding a mixture of the silicon compound (S2) and the catalyst to a raw material liquid containing the organosilicon compound (S1) represented by a general formula (5) and water, the mixture of the silicon compound (S2) and the catalyst are added while keeping a molar ratio of an amount of the silicon compound (S2) to an amount of the organosilicon compound (S1) within 0.001/min to 0.3/min.

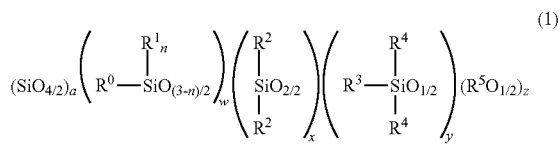
(1)

(In the formula (1), $R^0$ is an organic group represented by the following general formula (2), $R^1$ is an organic group that includes at least one functional group having 1 to 10 carbon atoms, $R^2$, $R^3$, and $R^4$ are independently a hydrogen atom or a hydrocarbon group having 1 to 10 carbon atoms, $R^5$ is a hydrocarbon group having 1 to 6 carbon atoms, n is 0 or 1, each of a, w, x, y, and z is a number of moles, provided that w is a positive number, each of x, y, and z is 0 or a positive number, and $0 \le a/w \le 1.8$, $0 \le x/(a+w) \le 2$, $0 \le y/(a+w) \le 2$, and $0 \le z/(a+w+x+y) \le 1$ are satisfied.)

(5)

(In the formula (5), $R^0$ is an organic group represented by the following general formula (2), $R^1$ is an organic group that includes at least one functional group having 1 to 10 carbon atoms, $R^{11}$ is a siloxane bond-forming group, and n is 0 or 1.)

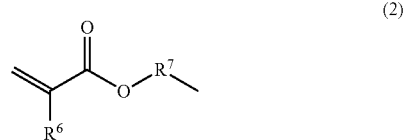
(2)

(In the formula (2), $R^6$ is a hydrogen atom or a methyl group, and $R^7$ is an alkylene group having 1 to 6 carbon atoms.)

Effect of the Invention

The reactive polysiloxane obtained by the production method of the present invention is soluble in an organic solvent such as propylene glycol monobutyl ether, 1-pentanol, 2-methyl-1-butanol, 1-octanol, and propylene glycol methyl ether acetate, and exhibits excellent storage stability in a solution thereof. The production method of the present invention does not cause an increase in viscosity and gelation during the production process, and can suitably be implemented industrially.

EMBODIMENT FOR CARRYING OUT THE INVENTION

Hereinafter, the present invention will be described in detail. Note that, "(meth)acryl" means acryl and methacryl, "(meth)acrylate" means acrylate and methacrylate, and "(meth)acryloyl group" means acryloyl and methacryloyl, in the specification.

The reactive polysiloxane obtained by the production method of the present invention is a hydrolysis copolycondensate of a raw material having a siloxane bond-forming group, the raw material compounds such as an organosilicon compound (S1) havings a (meth)acryloyl group and a siloxane bond-forming group, and at least one silicon compound (S2) selected from a tetraalkoxysilane and a tetrahalogenosilane. The reactive polysiloxane is represented by the following general formula (1).

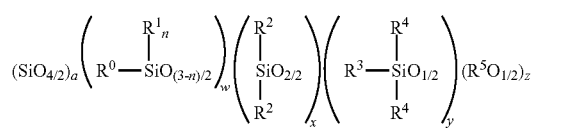
(1)

The term "siloxane bond-forming group" refers to a group that forms a siloxane bond through hydrolysis and condensation (e.g., hydrolyzable group and hydroxyl group). Examples of the siloxane bond-forming group include a hydroxyl group, a halogeno group, an alkoxy group, and the like. Among these, an alkoxy group is preferable since the alkoxy group exhibits excellent hydrolyzability, and does not produce an acid as a by-product. An alkoxy group having 1 to 3 carbon atoms is more preferable. This explanation applies to $R^{11}$ in the general formula (5) and the like.

In the general formula (1), $R^0$ is an organic group that includes at least one selected among a methacryloyl group and an acryloyl group, $R^1$ is an organic group that includes at least one functional group having 1 to 10 carbon atoms, $R^2$, $R^3$, and $R^4$ are independently a hydrogen atom or a hydrocarbon group having 1 to 10 carbon atoms, $R^5$ is a hydrocarbon group having 1 to 6 carbon atoms, n is 0 or 1, each of a, w, x, y, and z is a number of moles, provided that w is a positive number, each of x, y, and z is 0 or a positive number, and $0 \le a/w \le 1.8$, $0 \le x/(a+w) \le 2$, $0 \le y/(a+w) \le 2$, and $0 \le z/(a+w+x+y) \le 1$ are satisfied.

In the general formula (1), $R^0$ is an organic group represented by the following general formula (2).

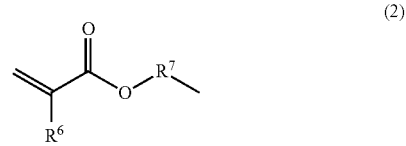
(2)

(In the formula (2), $R^6$ is a hydrogen atom or a methyl group, and $R^7$ is an alkylene group having 1 to 6 carbon atoms.)

Specifically, the reactive polysiloxane is a polymer having a structural units represented by the following general formulae (11) and (12), and may have a structural unit represented by the following general formula (13), a structural unit represented by the following general formula (14), and a structural unit represented by the following general formula (15).

(11)

(12)

(13)

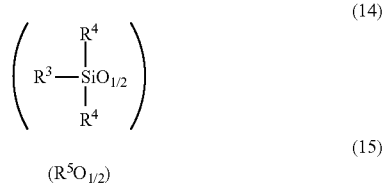

$$\left( R^3 - \underset{\underset{R^4}{|}}{\overset{\overset{R^4}{|}}{Si}} O_{1/2} \right) \quad (14)$$

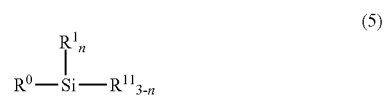

$$(R^5 O_{1/2}) \quad (15)$$

The structural unit represented by the general formula (11) has four Si—O— bonds, and is referred to as "Q structure". A raw material that forms the Q structure through condensation is referred to as "Q monomer". The Q monomer is a tetraalkoxysilane or a tetrahalogenosilane according to the present invention, and is specifically a silicon compound (S2) having four siloxane bond-forming groups. Examples of the preferable tetraalkoxysilane include a tetraalkoxysilane including an alkoxy group having 1 to 3 carbon atoms, such as tetramethoxysilane (TMOS), tetraethoxysilane, tetra-1-propoxysilane, and tetra-2-propoxysilane. Examples of the preferable tetrahalogenosilane include tetrachlorosilane and the like.

The structural unit represented by the general formula (12) is a structural unit that has a reactive functional group and is derived from the organosilicon compound (S1) represented by the following general formula (5).

$$R^0 - \underset{\underset{}{|}}{\overset{\overset{R^1_n}{|}}{Si}} - R^{11}_{3-n} \quad (5)$$

(In the formula (5), $R^0$ is an organic group represented by the general formula (2), $R^1$ is an organic group that includes at least one functional group having 1 to 10 carbon atoms, $R^{11}$ is a siloxane bond-forming group, and n is 0 or 1.)

$R^7$ in the general formula (2) is preferably a propylene group. This is because the organosilicon compound represented by the general formula (5) used as a raw material leading to the structural unit represented by the general formula (12) having such an organic functional group is easily available, or can be easily synthesized. $R^6$ is preferably a methyl group.

$R^1$ in the general formulae (1) and (5) is an organic group that includes at least one functional group having 1 to 10 carbon atoms. $R^1$ is preferably selected from an organic group that includes an alkyl group having 1 to 6 carbon atoms, an organic group that includes an aralkyl group having 7 to 10 carbon atoms, and an organic group that includes an aryl group having 6 to 10 carbon atoms. A plurality of $R^1$s may be either identical or different in the case where a plurality of $R^1$s is present.

In the general formulae (1), (5), and (12), n is 0 or 1. When n is 0, the structural unit represented by the formula (12) has three Si—O— bonds, and is referred to as "T structure". When n is 1, the structural unit represented by the formula (12) has two Si—O— bonds, and is referred to as "D structure". A trifunctional organosilicon compound having three siloxane bond-forming groups in the molecule, and leading to the T structure through condensation is referred to as "T monomer", and a bifunctional organosilicon compound having two siloxane bond-forming groups in the molecule, and leading to the D structure through condensation is referred to as "D monomer". The T monomer and the D monomer are included in the compound represented by the general formula (5).

When the reactive polysiloxane represented by the general formula (1) in which the content ratio of the structural unit represented by the general formula (11) in the polysiloxane molecule is relatively high is applied to a curable composition, the resulting cured product exhibits improved hardness and heat resistance. If the content ratio of the structural unit represented by the general formula (11) is too high, the polysiloxane tends to be insoluble. Moreover, the viscosity of the polymer solution may be increased, and handling may be difficult. In the present invention, $0<a/w\le1.8$ is satisfied, it is preferably $0.3\le a/w\le1.8$, more preferably $0.8\le a/w\le1.8$, and particularly $1.0\le a/w\le1.8$. When the raw material is used so that the compositional ratio of the components are set to be equal to the ratio of the corresponding structural units in the condensation process according to the present invention, a polysiloxane having the desired composition can be obtained.

It is preferable that the content ratio of the T structure (i.e., the structural unit represented by the general formula (12) wherein n is 0) in the reactive polysiloxane represented by the general formula (1) is high since the heat resistance of the reactive polysiloxane tends to be improved. When it is desired to improve the solubility of the reactive polysiloxane in an organic solvent, it is preferable that the content ratio of the D structure (i.e., the structural unit represented by the general formula (12) wherein n is 1) is high. The reactive polysiloxane obtained by the present invention may include a polysiloxane that includes the structural unit having the T structure and the structural unit having the D structure in the same molecule, or may include the reactive polysiloxane having the T structure and the reactive polysiloxane having the D structure. The ratio of the T structure to the D structure can be determined by the ratio of the raw material used when synthesizing the reactive polysiloxane. A ratio of the T structure to the D structure is appropriately selected depending on the application of the reactive polysiloxane. In the present invention, the reactive polysiloxane is preferably a polysiloxane wherein the average value of n in the general formula (1) is 0 to 0.5, and more preferably a polysiloxane wherein the average value of n in the general formula (1) is 0 to 0.3.

Examples of the T monomer include 2-acryloxyethyltrimethoxysilane, 2-acryloxyethyltriethoxysilane, 3-acryloxypropyltrimethoxysilane, 3-acryloxypropyltriethoxysilane, 2-methacryloxyethyltrimethoxysilane, 2-methacryloxyethyltriethoxysilane, 3-methacryloxypropyltrimethoxysilane, 3-methacryloxypropyltriethoxysilane, and the like.

Examples of the D monomer include 2-acryloxyethyldimethoxymethylsilane, 2-acryloxyethyldiethoxymethylsilane, 3-acryloxypropyldimethoxymethylsilane, 3-acryloxypropyldiethoxyethylsilane, 2-methacryloxyethyldimethoxymethylsilane, 2-methacryloxyethyldiethoxyethylsilane, 3-methacryloxypropyldimethoxymethylsilane, 3-methacryloxypropyldiethoxyethylsilane, and the like.

$R^2$ in the general formulae (1) and (13) is a hydrogen atom or a hydrocarbon group having 1 to 10 carbon atoms. $R^2$ is preferably a methyl group or a phenyl group, and more preferably a methyl group having low steric hindrance. Two $R^2$s may be either identical or different. When the two $R^2$ are different, the two $R^2$ may be a methyl group and a phenyl group.

Examples of an organosilicon compound that forms the structural unit represented by the general formula (13) include dimethoxymethylsilane, dimethoxydimethylsilane, dimethoxymethylphenylsilane, dimethoxydiphenylsilane, diethoxymethylsilane, diethoxydimethylsilane, diethoxyethylphenylsilane, diethoxydiphenylsilane, and the like.

The structural units (11), (12), and (13) are included in the reactive polysiloxane so that $0 \leq x/(a+w) \leq 2$ (preferably $0 \leq x/(a+w) \leq 1$) is satisfied. Specifically, the reactive polysiloxane may or may not have the structural unit represented by the general formula (13).

In the general formulae (1) and (14), $R^3$ and $R^4$ are independently a hydrogen atom or a hydrocarbon group having 1 to 10 carbon atoms. $R^3$ is preferably a methyl group, an ethyl group, a propyl group, or a phenyl group, and more preferably a methyl group. $R^4$ is preferably a methyl group, an ethyl group, or a propyl group, and more preferably a methyl group. In the general formulae (1) and (14), $R^3$ and two $R^4$s may be the same hydrocarbon groups, or $R^3$ and two $R^4$s may be different.

An organosilicon compound that forms the structural unit (14) is an M monomer described below, and the like.

The structural units (11), (12), and (14) are included in the reactive polysiloxane so that $0 \leq y/(a+w) \leq 2$ (preferably $0 \leq y/(a+w) \leq 1$) is satisfied. Specifically, the reactive polysiloxane may or may not have the structural unit represented by the general formula (14).

The structural unit represented by the formula (14) has one Si—O— bond, and is referred to as "M structure". The M structure blocks the terminal of the condensation chain of the polysiloxane. When the molecular weight of the reactive polysiloxane is controlled, it is preferable to use a raw material (M monomer) having only one siloxane bond-forming group, and leading to the M structure through condensation.

Examples of the M monomer include methoxydimethylsilane, ethoxydimethylsilane, methoxytrimethylsilane, ethoxytrimethylsilane, hexamethyldisiloxane, and the like.

$R^5$ in the general formulae (1) and (15) is an alkyl group having 1 to 6 carbon atoms. $R^5$ is preferably a methyl group, an ethyl group, or a propyl group, more preferably a propyl group, and further preferably a n-propyl group.

The structural unit (15) is a structural unit derived from the organosilicon compound (S1) and the silicon compound (S2). The structural unit (15) is formed, for example, when the siloxane bond-forming group is not reacted, and polycondensation is not progressed in the condensation process.

The structural units (11) to (15) are included in the reactive polysiloxane so that $0 \leq z/(a+w+x+y) \leq 1$ (preferably $0.01 \leq z/(a+w+x+y) \leq 0.5$) is satisfied.

The reactive polysiloxane according to the present invention can be produced by subjecting a raw material having a siloxane bond-forming group and respectively leading to the structural units represented by the general formulae (11) to (15) to a condensation process (hereinafter referred to as "first process"). The raw material indispensably includes the organosilicon compound (S1) and the silicon compound (S2).

The silicon compound (S2) used in the first process is particularly a Q monomer obtained by subjecting a tetraalkoxysilane having identical alkoxy groups to alcohol exchange reaction in the presence of 1-propanol and a catalyst.

The alcohol exchange reaction of the tetraalkoxysilane may be conducted in the presence of a basic catalyst or an acidic catalyst. The catalyst is preferably a basic catalyst, and more preferably tetramethylammonium hydroxide (TMAH) that does not contain a metal. The catalyst used for hydrolysis and copolycondensation in the first process may be a basic catalyst or an acidic catalyst, and is preferably a basic catalyst. When an identical catalyst is used for the alcohol exchange reaction and the first process, the first process can be performed without providing a process in which the remaining catalyst is removed after the alcohol exchange reaction.

When the catalyst is a basic catalyst, it is preferable that $R^2$ in the organosilicon compound that forms the structural unit (13), and $R^3$ and $R^4$ in the organosilicon compound that forms the structural unit (14), are not hydrogen atoms and are hydrocarbon groups having 1 to 10 carbon atoms.

The organosilicon compound (S1) and the silicon compound (S2) are used so that the molar ratio (S2)/(S1) is 1.8 or less. The raw materials that form the structural units (13), (14) and (15) are used in the following selected ratio. The usage amounts of the raw material that forms the structural unit (13) is selected with the usage amounts of the organosilicon compounds (S1) and (S2) so that $0 \leq x/(a+w) \leq 2$ (preferably $0 \leq x/(a+w) \leq 1$) is satisfied.

The usage amounts of the raw material that forms the structural unit (14) is selected with the usage amounts of the organosilicon compounds (S1) and (S2) so that $0 \leq y/(a+w) \leq 2$ (preferably $0 \leq y/(a+w) \leq 1$) is satisfied.

In the first process, copolycondensation is preferably effected under acid or alkaline conditions (more preferably under alkaline conditions). The first process is conducted while gradually adding a mixture of the silicon compound (S2) and the catalyst (hereinafter the mixture is referred to as "raw material liquid (V2)") to a raw material liquid containing the organosilicon compound (S1) and water (hereinafter the mixture is referred to as "raw material liquid (V1)"), the raw material liquid (V2) is added while keeping a molar ratio of an amount of the silicon compound (S2) to an amount of the organosilicon compound (S1) within 0.001/min to 0.3/min, and preferably within 0.002/min to 0.2/min. In the present invention, it is preferable to effect the reaction while adding the raw material liquid (V2) that includes the catalyst and the silicon compound (S2) such as Q monomer to the raw material liquid (V1) that includes the organosilicon compound (S1) such as T monomer for 5 minutes to 12 hours.

The raw material liquid (V1) includes water as mentioned above. The molar ratio of water to the hydrolyzable group included in the organosilicon compound (S1) is preferably in the range from 0.5 to 10, and more preferably from 0.5 to 3.

Examples of a basic catalyst that may be used as the catalyst included in the raw material liquid (V2) include ammonia, organic amines, tetramethylammonium hydroxide, tetraethylammonium hydroxide, tetrapropylammonium hydroxide, tetrabutylammonium hydroxide, choline, sodium hydroxide, potassium hydroxide, calcium hydroxide, and the like. Among these, an ammonium compound having a quaternary nitrogen atom that exhibits excellent catalytic activity is preferable, and tetramethylammonium hydroxide is more preferable.

In the case where the silicon compound (S2) includes a compound obtained by subjecting a tetraalkoxysilane to alcohol exchange reaction in the presence of a basic catalyst, the reaction liquid obtained by the alcohol exchange reaction can be used directly in the first process. In other words, the basic catalyst used for the alcohol exchange reaction can be used in the first process. The molar ratio of the catalyst to the silicon compound (S2) included in the raw material liquid (V2) is preferably in the range from 0.001 to 0.6, and more preferably from 0.005 to 0.3.

In the first process, when the raw material liquid (V2) is added to the raw material liquid (V1), a siloxane bond-forming reaction occurs in the reaction liquid through hydrolysis to produce a polysiloxane. On the other hand, the organosilicon compound (S1) and an alcohol undergo a side reaction in the reaction liquid, and some of the (meth)acryloyl groups undergo alcoholysis to produce a (meth)acrylic acid ester. The side reaction is promoted in the presence of a basic catalyst. Therefore, although the catalyst used in the first process is not particularly limited, it is preferable to add the catalyst to the raw material liquid (V2) including the silicon compound (S2), and not to add the catalyst to the raw material liquid (V1) including the organosilicon compound (S1) in order to improve the yield of (meth)acrylic groups included in the resulting reactive polysiloxane.

A preferable method is to add the silicon compound (S2) (e.g., Q monomer) included in the raw material liquid (V2) to the raw material liquid (V1) that includes the organosilicon compound (S1) (e.g., T monomer) at a constant rate, or intermittently. It is preferable to continuously add the raw material liquid (V2) for 5 minutes or more in order to completely add the silicon compound (S2). The upper limit of the addition time is preferably 12 hours or less. The addition time of the raw material liquid (V2) is more preferably ten minutes to 6 hours, and particularly 20 to 60 minutes. When the organosilicon compound (S1) and the silicon compound (S2) are reacted using a mixture of the organosilicon compound (S1) and the silicon compound (S2) prepared in advance, the stability of the resulting polysiloxane may be deteriorated, and gelation may be occurred during or after the reaction, being unfavorable.

The industrial productivity of the reactive polysiloxane is improved by shortening the addition time of the raw material liquid (V2), however, it may be difficult to remove heat due to an exothermic reaction. Such a problem may be reduced by increasing the addition time of the raw material liquid (V2). However, when unreacted organosilicon compound (S1) such as T monomer is held for a long time in the reactor, the methacryloyl group or acryloyl group represented by $R^0$ in the general formula (1) may be decomposed. Therefore, the addition rate and the addition time of the raw material liquid (V2) are set within the above preferable ranges. The raw material liquid (V2) is added while keeping the molar ratio of the amount of the silicon compound (S2) to the amount of the organosilicon compound (S1) within 0.001/min to 0.3/min. The addition rate of the raw material liquid (V2) may be set to be constant, or may be appropriately changed as long as the molar ratio is kept within the above range. The raw material liquid (V2) may be added continuously, or may be added intermittently.

The term "reaction temperature" according to the production of the present invention refers to a temperature during a period from completion of the addition of the raw material liquid (V2) that includes the silicon compound (S2) and the catalyst to the raw material liquid (V1) that includes the organosilicon compound (S1), to a time at which the subsequent process (e.g., neutralization process) is performed. It is convenient to effect the condensation reaction while keeping a constant temperature. The inventors found that it is difficult to control the condensation reaction, and the energy cost increases if the reaction temperature is too high, and that a methacryloyl group or an acryloyl group decomposes in the same manner as in a case of increasing the addition time of the raw material liquid (V2) if the reaction temperature is too high. The inventors further found that the reaction time increases, and gelation easily occurs during the reaction if the reaction temperature is too low. The upper limit of the reaction temperature is preferably 100° C., more preferably 80° C., and further preferably 60° C. The lower limit of the reaction temperature is preferably 0° C., more preferably 15° C., and further preferably 30° C. taking account of the possibility that the reaction liquid is frozen. The reaction temperature may be constant throughout the reaction, or may be increased during the reaction. For example, it is preferable to set the reaction temperature at a low temperature (e.g., 30° C.) at the initial stage of the addition of the raw material liquid (V2), and gradually increase the reaction temperature while adding the raw material liquid (V2) to a reactor containing the raw material liquid (V1). It is preferable to adjust the reaction temperature to the preset temperature when adding the raw material liquid (V2).

The advantageous effects achieved by the first process are described below. When the first process is performed in an embodiment in which the raw material liquid (V1) containing the organosilicon compound (S1) does not include a catalyst, alcoholysis of the (meth)acryloyl group is suppressed. Even if alcoholysis has occurred to some extent, a by-product (meth)acrylate can be easily removed since the by-product (meth)acrylate has a vapor pressure higher than that of the polysiloxane. Therefore, the polysiloxane is affected to only a small extent. The present inventors found that (meth)acryloyl group is stable against alcoholysis after the T structure is incorporated in the polysiloxane. Therefore, the organosilicon compound (S1) having the (meth)acryloyl group is efficiently incorporated in the reactive polysiloxane in the first process, and a by-product (meth)acrylate is produced to only a small extent.

The tetrafunctional Q monomer used as the silicon compound (S2) is easily and strongly crosslinked with each other. When the raw material liquid (V2) is added to the raw material liquid (V1) that includes a relatively large amount of the organosilicon compound (S1) is at the above specific rate, hydrolysis and condensation of the organosilicon compound (S1) and the silicon compound (S2) proceed promptly, and gelation is suppressed. The production method of the present invention leads to a reactive polysiloxane that keeps solvent solubility while suppressing gelation by adding water necessary for hydrolysis to the raw material liquid (V1) that includes the organosilicon compound (S1), adding the catalyst to the raw material liquid (V2) that includes the silicon compound (S2), and adding the raw material liquid (V2) at the above specific rate. It is difficult for even a skilled person to expect such a combination.

The production method of the present invention may sequentially include, after the first process, a process in which a process in which a reaction liquid containing the reactive polysiloxane is neutralized (hereinafter referred to as "second process"), a process in which a resulting reaction liquid after the neutrarization (e.g., neutralized reaction liquid) is concentrated (hereinafter may be referred to as "third process"), a process in which a resulting concentrate and an organic solvent for water washing are mixed and the reactive polysiloxane is dissolved in the organic solvent for water washing (hereinafter may be referred to as "fourth process"), a process in which a resulting organic solution is brought into contact with water and a water layer is removed from a mixed liquid (hereinafter may be referred to as "fifth process"), and a process in which a medium is removed from a collected oil layer (hereinafter may be referred to as "sixth process").

The second process is a process in which a reaction liquid containing the reactive polysiloxane is neutralized. In the case where the first process is conducted in the presence of a basic catalyst, the reaction liquid is neutralized using oxalic acid, hydrochloric acid, nitric acid, or the like. The reactive polysiloxane included in the neutralized reaction liquid is not modified, and can be dissolved directly in the organic solvent for water washing in the fourth process, and then subjected to the fifth process. In the case where the raw material used in the first process includes an organosilicon compound in which the siloxane bond-forming group is an alkoxy group, however, an alcohol is produced in the first process as a by-product. When an alcohol is used as the reaction solvent, the alcohol is contained in the reaction liquid. In the case where the alcohol contained in the reaction liquid remains after the fourth process, the oil-water separation efficiency may be deteriorated in the fifth process. Therefore, when an organosilicon compound having an alkoxy group is used as the raw material, it is possible to improve yield in the fifth process by providing a process that removes an alcohol before the fourth process. Specifically, it is preferable to provide the third process before the fourth process.

In the first process, a condensation rate of the raw material is preferably 92% or more by mol, more preferably 95% or more by mol, and further preferably 98% or more by mol. It is most preferable that substantially all of the siloxane bond-forming groups (including a hydrolyzable group) be condensed. The upper limit of the condensation rate is normally 99.9% by mol. Therefore, the reactive polysiloxane solution produced by the production method of the present invention may include a reactive polysiloxane in which a hydrolyzable group that is not condensed remains in the structure represented by the general formula (1). The hydrolyzable group residue rate is preferably 8% or less by mol, and more preferably 2% or less by mol.

When the siloxane bond-forming group (including a hydrolyzable group) remains in the reactive polysiloxane, the siloxane bond-forming group residue rate can be calculated from the integral ratio of each signal in the $^1$H-NMR (nuclear magnetic resonance spectrum) chart. It can be determined that substantially all of the hydrolyzable groups have been condensed when almost no signal based on the hydrolyzable group is observed in the $^1$H-NMR chart of the resulting reactive polysiloxane.

The organic solvent for water washing used in the fourth process is a compound which is capable of dissolving a reactive polysiloxane obtained by the first process, and is preferably forms an oil layer containing the reactive polysiloxane, which can be easily separated from a water layer in the fourth process. Moreover, it is preferable that the organic solvent for water washing be a compound that has a moderate vapor pressure for the sixth process, and does not erode the resin.

Specific examples of the organic solvent for water washing include 1-octanol, 1-pentanol, 2-methyl-1-butanol, and propylene glycol monobutyl ether, diisopropylether, propylene glycol methyl ether acetate, and the like. These compounds may be used singly or in combination of two or more types thereof. In the present invention, propylene glycol monobutyl ether is preferable.

The usage amount of the organic solvent for water washing is preferably in the range from 20 to 1,000 parts by mass, and more preferably from 50 to 500 parts by mass based on 100 parts by mass of the theoretical production amount of the reactive polysiloxane from the viewpoint of solubility of the reactive polysiloxane, water/oil separation capability in the fifth process and a reduction in cost.

The fifth process is a process in which a resulting organic solution (that is obtained by the fourth process and contains the reactive polysiloxane dissolved therein) is brought into contact with water and a water layer is removed from a mixed liquid. Specifically, the fifth process is a process in which the mixed liquid is separated into an oil layer and a water layer so that the water-soluble component contained in the organic solution is transitioned to the water layer, and the water layer is removed from the oil layer containing the reactive polysiloxane. According to the fifth process, a polysiloxane solution can be obtained in which the reactive polysiloxane is dissolved in the organic solvent for water washing. In small-scale production, water and an organic solution may be brought into contact with each other (or mixed) using a separating funnel, and a water layer may be discharged from the bottom of the separating funnel. In this case, the addition of water and the discharge of the water layer may be repeated until the water-soluble component is sufficiently removed from the organic solution. The water layer may be made acidic or alkaline depending on the removal target water-soluble component. A method using an aqueous solution of an inorganic salt is also known. A counter-current extraction system or the like that utilizes the same principle may be used on an industrial scale. The production method of the present invention may utilize an arbitrary method. Examples of water that is preferably used in the fifth process include deionized water, a saturated sodium chloride solution, and the like. It is possible to use a publicly known aqueous component that is normally used to wash an organic polymer.

Since the oil layer obtained by the fifth process is a polymer solution in which the reactive polysiloxane is dissolved, the medium can be removed to collect the reactive polysiloxane in the sixth process. The medium mainly includes the organic solvent for water washing used in the fourth process. When the medium is not a substance that adversely affects the storage stability of the reactive polysiloxane, the medium may be diluted with the same organic solvent as the organic solvent for water washing used in the fourth process to obtain a reactive polysiloxane solution. An organic solvent mentioned later may also be used. The concentration of the reactive polysiloxane in the reactive polysiloxane solution is preferably in the range from 0.1% to 80% by mass, and more preferably 1% to 70% by mass.

The organic solvent included in the reactive polysiloxane solution is preferably a compound having one alcoholic hydroxyl group in the molecule such as an alkyl alcohol and a propylene glycol monoalkyl ether. Specific example thereof includes methanol, ethanol, 1-propanol, isopropyl alcohol, 1-butanol, isobutyl alcohol, t-butyl alcohol, 2-methyl-1-butanol, 3-methyl-1-butanol, 2,2-dimethyl-1-propanol, 1-pentanol, 2-pentanol, 1-octanol, 3-methyl-2-butanol, 3-pentanol, 2-methyl-2-butanol, cyclopentanol, propylene glycol monomethyl ether, propylene glycol monoethyl ether, propylene glycol monopropyl ether, propylene glycol monobutyl ether, and the like. The medium in the reactive polysiloxane solution contains the organic solvent for water washing in an amount of preferably 1% to 100% by mass, more preferably 50% to 100% by mass, and particularly 100% by mass.

The number average molecular weight (Mn) of the reactive polysiloxane can be calculated as a polystyrene-reduced value by performing gel permeation chromatography (GPC) at a temperature of 40° C. using tetrahydrofuran (THF) as a carrier solvent, for example. Mn of the reactive polysiloxane is preferably in the range from 500 to 100,000, more preferably from 1,000 to 50,000, and further preferably from 2,000 to 20,000.

Since the reactive polysiloxane obtained by the production method of the present invention has a (meth)acryloyl group (see the general formula (1)), a cured product can be obtained by reacting the reactive polysiloxane in the presence of a polymerization initiator. In this case, a curable composition described later that includes an additional component may be prepared. A reactive polysiloxane solution may be prepared after the sixth process using an organic solvent that dissolves the reactive polysiloxane. A radical polymerization inhibitor, an antioxidant, and the like may be added to the curable composition or the reactive polysiloxane solution in order to ensure excellent storage stability. Examples of the additional component include a polymerizable unsaturated compound, a UV absorber, a light stabilizer, a leveling agent, an organic polymer, a filler, metal particles, a pigment, a sensitizer, an organic solvent, and the like.

The curable composition may be an active energy ray-curable composition or a heat-curable composition.

The radical polymerization inhibitor and the antioxidant which may be added to the curable composition or the reactive polysiloxane solution are as follows.

Examples of the radical polymerization inhibitor include a phenol-based compound such as hydroquinone and hydroquinone monomethyl ether, N-nitrosophenylhydroxylamine salt, and the like.

Examples of the antioxidant include a hindered phenol antioxidant such as 2,6-di-t-butyl-4-methylphenol and pentaerythritol tetrakis(3-(3,5-di-t-butyl-4-hydroxyphenyl)propionate), a sulfur-based secondary antioxidant such as 4,6-bis(octylthiomethyl)-o-cresol, a phosphorus-based secondary antioxidant, and the like. These antioxidants may be used singly or in combination of two or more types thereof. When the polymer solution includes a radical polymerization inhibitor or an antioxidant, the storage stability, thermal stability, and the like of the curable composition containing the reactive polysiloxane and the reactive polysiloxane can be improved.

When the curable composition or the reactive polysiloxane solution includes a radical polymerization inhibitor, the content of the radical polymerization inhibitor in the curable composition or the reactive polysiloxane solution is preferably in the range from 1 to 10,000 parts by mass, more preferably from 10 to 2,000 parts by mass, and further preferably from 100 to 500 parts by mass based on 1,000,000 parts by mass of the reactive polysiloxane.

When the curable composition or the reactive polysiloxane solution contains an antioxidant, the content of the antioxidant in the curable composition or the reactive polysiloxane solution is preferably in the range from 1 to 10,000 parts by mass, more preferably from 10 to 2,000 parts by mass, and further preferably from 100 to 500 parts by mass based on 1,000,000 parts by mass of the reactive polysiloxane.

Examples of the polymerization initiator which may be added to the curable composition include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, and the like.

The polymerizable unsaturated compound which may be added to the curable composition is preferably a compound having an acryloyl group or a methacryloyl group (hereinafter referred to as "(meth)acrylate compound") or the like in order to adjust the properties (e.g., hardness, mechanical strength, chemical resistance, and adhesion) of a cured product formed using the composition, obtain a cured film which is excellent in adhesion to a substrate, and adjust the viscosity, curability, and the like of the curable composition, for example.

Examples of the (meth)acrylate compound include a monofunctional (meth)acrylate, a polyfunctional (meth)acrylate, a urethane (meth)acrylate, and the like. These compounds may be used singly or in combination of two or more types thereof.

Examples of the UV absorber which may be added to the curable composition include a hydroxyphenyltriazine-based UV absorber such as 2-[4-[(2-hydroxy-3-dodecyloxypropyl)oxy]-2-hydroxyphenyl]-4,6-bis(2,4-dimethylphenyl)-1,3,5-triazine, a benzotriazole-based UV absorber such as 2-(2H-benzotriazol-2-yl)-4,6-bis(1-methyl-1-phenylethyl)phenol, an inorganic fine particle that absorbs UV rays, such as titanium oxide particle and zinc oxide particle, and the like.

These components may be used singly or in combination of two or more types thereof.

Examples of the light stabilizer which may be added to the curable composition include a hindered amine light stabilizer such as bis(1,2,2,6,6-pentamethyl-4-piperidinyl)sebacate, and the like.

When the UV absorber and the light stabilizer are used, a cured film excellent in UV resistance and weatherability can be obtained.

Examples of the leveling agent which may be added to the curable composition include a silicone polymer, a fluorine-containing polymer, and the like. The leveling agent improves leveling properties when applying the curable composition.

Examples of the organic polymer which may be added to the curable composition include a (meth)acrylic polymer, an epoxy polymer, and the like. Examples of a preferable monomer forming these polymers include methyl methacrylate, cyclohexyl (meth)acrylate, N-(2-(meth)acryloxyethyl)tetrahydrophtalimide, and the like.

Examples of the filler which may be added to the curable composition include a silica particle, an alumina particle, and the like.

EXAMPLES

The present invention is further described below by ways of Examples. Note that the present invention is not limited to the following examples.

The number average molecular weight (Mn) was determined as follows. The polymer solution was subjected to gel permeation chromatography (hereinafter abbreviated as "GPC") at a temperature of 40° C. using GPC columns "TSK-Gel G4000H" and "TSK-Gel G2000H" (manufactured by Tosoh Corporation) connected in series and THF as an eluant, and the molecular weight was calculated from the retention time using standard: polystyrene.

The reactive polysiloxane was subjected to $^1$H-NMR analysis as follows. About 1 g of the measurement sample and about 100 mg of hexamethyldisiloxane (HMDSO) as an internal standard substance were accurately weighed, and dissolved in deuterated chloroform as an analysis solvent, and analysis was performed based on the signal intensity of the proton of HMDSO.

1. Production and Evaluation of Reactive Polysiloxane and Polymer Solution

Q monomer solutions prepared in Reference Examples 1 to 4 using tetramethoxysilane (TMOS) (i.e., Q monomer) as the silicon compound (S2) were used in Examples and Comparative Examples.

Reference Example 1

A flask was charged with 22.90 g of 1-propanol and 19.03 g (0.125 mol) of tetramethoxysilane (TMOS). 5.71 g of a methanol solution of 25% by mass of tetramethylammonium hydroxide (containing 0.117 mol of methanol and 15.7 mmol of tetramethylammonium hydroxide) was slowly added to the mixture while stirring, and these were reacted at a temperature of 60° C. for 1 hour to prepare a Q monomer solution. The Q monomer solution was then subjected to gas chromatography with FID detector to detect a Q monomer (Q1) containing compounds in which at least one methoxy group of TMOS is substituted with a 1-propoxy group (e.g., 1-substituted product, 2-substituted product, 3-substituted product, and 4-substituted product), and unreacted TMOS. The total content of the 1-propoxy group-containing compound was about 90% by mol based on the total amount of the Q monomer (Q1) in the Q monomer solution. The number of substitutions with 1-propanol (i.e., the average number of 1-propoxy groups per molecule of the 1-propoxy group-containing compound) was calculated based on the peak area of the product determined from the gas chromatogram, and found to be 1.9.

Reference Example 2

A Q monomer solution containing a Q monomer (Q2) and tetramethylammonium hydroxide was prepared in the same manner as those in Reference Example 1, except that the usage amount of tetramethoxysilane was changed to 4.57 g (0.03 mol). The Q monomer solution was then subjected to gas chromatography with FID detector to detect a Q monomer (Q2) containing compounds in which at least one methoxy group of TMOS is substituted with a 1-propoxy group (e.g., 1-substituted product, 2-substituted product, 3-substituted product, and 4-substituted product), and unreacted TMOS. The total content of the 1-propoxy group-containing compound was about 90% by mol based on the total amount of the Q monomer (Q2) in the Q monomer solution. The number of substitutions with 1-propanol (i.e., the average number of 1-propoxy groups per molecule of the 1-propoxy group-containing compound) was calculated based on the peak area of the product determined from the gas chromatogram, and found to be 1.9.

Reference Example 3

A Q monomer solution containing a Q monomer (Q3) and tetramethylammonium hydroxide was prepared in the same manner as those in Reference Example 1, except that the usage amount of tetramethoxysilane was changed to 27.40 g (0.18 mol). The Q monomer solution was then subjected to gas chromatography with FID detector to detect a Q monomer (Q3) containing compounds in which at least one methoxy group of TMOS is substituted with a 1-propoxy group (e.g., 1-substituted product, 2-substituted product, 3-substituted product, and 4-substituted product), and unreacted TMOS. The total content of the 1-propoxy group-containing compound was about 90% by mol based on the total amount of the Q monomer (Q3) in the Q monomer solution. The number of substitutions with 1-propanol (i.e., the average number of 1-propoxy groups per molecule of the 1-propoxy group-containing compound) was calculated based on the peak area of the product determined from the gas chromatogram, and found to be 1.9.

Reference Example 4

A flask was charged with 23.86 g of 1-propanol and 19.83 g (0.13 mol) of tetramethoxysilane (TMOS). 2.06 g of a methanol solution of 25% by mass of tetramethylammonium hydroxide (containing 0.042 mol of methanol and 5.65 mmol of tetramethylammonium hydroxide) was slowly added to the mixture while stirring, and these were reacted at a temperature of 60° C. for 1 hour to prepare a Q monomer solution. The Q monomer solution was then subjected to gas chromatography with FID detector to detect a Q monomer (Q4) containing compounds in which at least one methoxy group of TMOS is substituted with a 1-propoxy group (e.g., 1-substituted product, 2-substituted product, 3-substituted product, and 4-substituted product), and unreacted TMOS. The total content of the 1-propoxy group-containing compound was about 90% by mol based on the total amount of the Q monomer (Q4) in the Q monomer solution. The number of substitutions with 1-propanol (i.e., the average number of 1-propoxy groups per molecule of the 1-propoxy group-containing compound) was calculated based on the peak area of the product determined from the gas chromatogram, and found to be 1.9.

Example 1

The Q monomer solution containing the Q monomer (Q1) in an amount of 0.125 mol and tetramethylammonium hydroxide as a catalyst, that was prepared in Reference Example 1 was used as the raw material liquid (V2) for dropwise addition.

On the other hand, 24.86 g (0.1 mol) of 3-methacryloxypropyltrimethoxysilane (T monomer) as the organosilicon compound (S1), 0.001 g of aluminum N-nitrosophenylhydroxylamine ("Q-1301" manufactured by Wako Pure Chemical Industries, Ltd.) as a polymerization inhibitor, 14.51 g (0.8 mol) of water, and 14.31 g of 1-propanol were mixed at a temperature of 60° C. to prepare a raw material liquid (V1) containing the T monomer.

The whole of the raw material liquid (V1) containing the T monomer was charged to a reactor. The raw material liquid (V2) was added dropwise to the reactor at a constant rate over 30 minutes using a dropping funnel while keeping the liquid temperature at 60° C.±10° C. Specifically, 0.125 mol of the Q monomer was added to 0.1 mol of the T monomer over 30 minutes. Therefore, the molar ratio A of the silicon compound (S2) to the organosilicon compound (S1) was 1.25, and the addition rate of the raw material liquid (V2) (i.e., the molar ratio of the silicon compound (S2) to the organosilicon compound (S1) per unit time) was 0.04/min (see Table 2). After the addition of the raw material liquid (V2), the reaction mixture was stirred at 60° C., and the reaction was terminated when 2 hours had elapsed. The above temperature (60° C.) and time (2 hours) are shown in Table 2 as the reaction temperature and the reaction time. Subsequently, 3.80 g (8.4 mmol) of a methanol solution of 20% by mass of oxalic acid was added to the mixture to neutralize tetramethylammonium hydroxide (catalyst). The solvent including methanol, 1-propanol, water, and the like was then partially evaporated from the neutralized solution at 30° C. or lower under reduced pressure. 25 g of propylene glycol monomethyl ether acetate (PGMEA) and 40 g of a saturated sodium chloride solution were added to the resulting concentrate, and the mixture was stirred. When the stirring was stopped, the liquid contained in the flask promptly was separated into two layers and the layers were clearly separated at the interface. After that, the water layer (lower layer) was discharged and 40 g of a saturated sodium chloride solution was added again. The mixture was stirred, and the water layer was discharged. The above operation was repeated six times (washing process). According to the process, salts and excess acids contained in the concentrate were removed.

After that, 1 mg of aluminum N-nitrosophenylhydroxylamine ("Q-1301" manufactured by Wako Pure Chemical Industries, Ltd.) as a polymerization inhibitor was added to the oil layer mainly containing the polysiloxane (C1) and PGMEA. The resulting mixture was heated under reduced pressure to evaporate part of the solvent. Salts and the like that precipitated were filtered off to obtain a transparent light yellow polymer solution of a reactive polysiloxane (C1). 0.6 g of the polymer solution was evaporated to dryness at 100° C. for 1 hour. The solid content in the polymer solution was calculated from the weight of the dry substance, and found to be 55.6% by mass. The yield of the polysiloxane (C1) based on the solid content was 23.71 g.

Mn of the reactive polysiloxane (C1) was 10,000. The reactive polysiloxane (C1) was subjected to $^1$H-NMR analysis. It was confirmed that a methacryloyl group was present in the reactive polysiloxane (C1). The content of the structural units (12) and the content of residual alkoxy groups were quantitatively determined by $^1$H-NMR. The content of the structural unit (11) was calculated based on the determination result. It was thus confirmed that the reactive polysiloxane (C1) was a polymer represented by the general formula (1) wherein a, w, x, y, and z are respectively 1.25, 1, 0, 0, and 0.14, and was a copolycondensation product obtained by the stoichiometric reactions between the raw materials.

The content of a residual alkoxy group (i.e., 1-propoxy group bonded to the silicon atom) in the reactive polysiloxane (C1) calculated from $^1$H-NMR chart was an amount corresponding to 1.7% with respect to the total content of alkoxy groups contained in the raw materials.

Example 2

A reactive polysiloxane (C2) was produced in the same manner as those in Example 1, except that the raw material liquid (V2) was added dropwise over 60 minutes. Mn of the reactive polysiloxane (C2) was 13,000. The yield of the reactive polysiloxane (C2) based on the solid content was 23.96 g.

The content of a residual alkoxy group (i.e., 1-propoxy group bonded to the silicon atom) in the reactive polysiloxane (C2) calculated from $^1$H-NMR chart was an amount corresponding to 2.5% with respect to the total content of alkoxy groups contained in the raw materials.

Example 3

A reactive polysiloxane (C3) was produced in the same manner as those in Example 1, except that the raw material liquid (V2) was added dropwise over 6 minutes. Mn of the reactive polysiloxane (C3) was 11,000. The yield of the reactive polysiloxane (C3) based on the solid content was 23.84 g.

The content of a residual alkoxy group (i.e., 1-propoxy group bonded to the silicon atom) in the reactive polysiloxane (C3) calculated from $^1$H-NMR chart was an amount corresponding to 2.3% with respect to the total content of alkoxy groups contained in the raw materials.

Example 4

A reactive polysiloxane (C4) was produced in the same manner as those in Example 1, except that the raw material liquid (V2) was added dropwise to the reactor at a constant rate over 30 minutes using a dropping funnel while keeping the temperature of the raw material liquid (V1) containing the T monomer that was contained in the reactor at 80° C.±10° C., and then the reaction system was stirred at 80° C. for 2 hours. Mn of the reactive polysiloxane (C4) was 11,000. The yield of the reactive polysiloxane (C4) based on the solid content was 23.80 g.

The content of a residual alkoxy group (i.e., 1-propoxy group bonded to the silicon atom) in the reactive polysiloxane (C4) calculated from $^1$H-NMR chart was an amount corresponding to 1.8% with respect to the total content of alkoxy groups contained in the raw materials.

Example 5

A reactive polysiloxane (C5) was produced in the same manner as those in Example 1, except that the raw material liquid (V2) was added dropwise to the reactor at a constant rate over 30 minutes using a dropping funnel while keeping the temperature of the raw material liquid (V1) containing the T monomer that was contained in the reactor at 30° C.±10° C., and then the reaction system was stirred at 30° C. for 2 hours. Mn of the reactive polysiloxane (C5) was 16,000. The yield of the reactive polysiloxane (C5) based on the solid content was 24.01 g.

The content of a residual alkoxy group (i.e., 1-propoxy group bonded to the silicon atom) in the reactive polysiloxane (C5) calculated from $^1$H-NMR chart was an amount corresponding to 3.3% with respect to the total content of alkoxy groups contained in the raw materials.

Example 6

A reactive polysiloxane (C6) was produced in the same manner as those in Example 1, except that the Q monomer solution containing the Q monomer (Q2) prepared in Reference Example 2 was used as the raw material liquid (V2) instead of the Q monomer solution used in Example 1. Mn of the reactive polysiloxane (C6) was 5,000. The yield of the reactive polysiloxane (C6) based on the solid content was 19.24 g.

The content of a residual alkoxy group (i.e., 1-propoxy group bonded to the silicon atom) in the reactive polysiloxane (C6) calculated from $^1$H-NMR chart was an amount corresponding to 1.6% with respect to the total content of alkoxy groups contained in the raw materials.

Example 7

A reactive polysiloxane (C7) was produced in the same manner as those in Example 1, except that the Q monomer solution containing the Q monomer (Q3) prepared in Reference Example 3 was used as the raw material liquid (V2) instead of the Q monomer solution used in Example 1. Mn of the reactive polysiloxane (C7) was 18,000. The yield of the reactive polysiloxane (C7) based on the solid content was 27.88 g.

The content of a residual alkoxy group (i.e., 1-propoxy group bonded to the silicon atom) in the reactive polysiloxane (C7) calculated from $^1$H-NMR chart was an amount corresponding to 3.6% with respect to the total content of alkoxy groups contained in the raw materials.

Comparative Example 1

The raw material liquid (V1) and the raw material liquid (V2) used in Example 1 were reversingly used for Comparative Example 1. Specifically, a reactor was charged with the Q monomer solution containing the Q monomer (Q1), and a mixture of the T monomer, water, and 1-propanol was then added dropwise to the reactor over 30 minutes. Gelation was occurred in the reaction liquid during the dropwise addition of the mixture.

Comparative Example 2

A Q monomer solution containing the Q monomer (Q4) and tetramethylammonium hydroxide prepared in Reference Example 4 was used in Comparative Example 2.

The Q monomer solution was put into a reactor, and acidified by adding a methanol solution of 18% by mass of oxalic acid (2.78 mmol). The pH of the Q monomer solution was thus changed from 10 to 4.

25.04 g (0.1 mol) of 3-methacryloxypropyltrimethoxysilane as a T monomer and 0.0015 g of aluminum N-nitrosophenylhydroxylamine as a polymerization inhibitor were added to the Q monomer solution to prepare a raw material liquid (V1). The raw material liquid (V1) was heated to 60° C.

On the other hand, a raw material liquid (V2) was prepared by mixing 5.81 g of a methanol solution of 25% by mass of tetramethylammonium hydroxide (containing 0.12 mol of methanol and 15.9 mmol of tetramethylammonium hydroxide), 14.52 g (0.8 mmol) of water, and 14.68 g of 1-propanol. The raw material liquid (V2) was added dropwise to the raw material liquid (V1) at a constant rate over 30 minutes using a dropping funnel while keeping the temperature of the reaction system at 60° C.±10° C. After the addition of the raw material liquid (V2), the reaction mixture was stirred at 60° C., and the reaction was terminated when 2 hours had elapsed.

Subsequently, 3.75 g (8.3 mmol) of a methanol solution of 20% by mass of oxalic acid was added to the reaction liquid to effect neutralization. The solvent including methanol, 1-propanol, water, and the like was then partially evaporated from the neutralized solution at 30° C. or lower under reduced pressure. 25 g of propylene glycol monomethyl ether acetate (PGMEA) and 40 g of a saturated sodium chloride solution were added to the resulting concentrate, and the mixture was stirred. When the stirring was stopped, the liquid contained in the flask promptly was separated into two layers and the layers were clearly separated at the interface. After that, the water layer (lower layer) was discharged and 40 g of a saturated sodium chloride solution was added again. The mixture was stirred, and the water layer was discharged. The above operation was repeated six times (washing process). According to the process, salts and excess acids contained in the concentrate were removed. After that, 1.5 mg of the above polymerization inhibitor was added to the oil layer mainly containing the polysiloxane (D2) and PGMEA. The resulting mixture was heated under reduced pressure to evaporate part of the solvent. Salts and the like that precipitated were filtered off to obtain a transparent light yellow polymer solution of a reactive polysiloxane (D2). 0.6 g of the polymer solution was evaporated to dryness at 100° C. for 1 hour. The solid content in the polymer solution was calculated from the weight of the dry substance, and found to be 53.2% by mass. The yield of the polysiloxane (D2) based on the solid content was 24.08 g.

Mn of the reactive polysiloxane (D2) was 14,000. The content of a residual alkoxy group (i.e., 1-propoxy group bonded to the silicon atom) in the reactive polysiloxane (D2) calculated from $^1$H-NMR chart was an amount corresponding to 3.5% with respect to the total content of alkoxy groups contained in the raw materials.

Comparative Example 3

A flask was charged with 19.03 g (0.125 mol) of TMOS as a Q monomer (Q5), 24.82 g (0.1 mol) of 3-methacryloxypropyltrimethoxysilane as a T monomer (organosilicon compound (S1)), 23.90 g of 1-propanol, and 1.5 mg of the above polymerization inhibitor to prepare a raw material liquid (V1). The raw material liquid (V1) was heated to 60° C.

On the other hand, a raw material liquid (V2) was prepared by mixing 5.80 g of a methanol solution of 25% by mass of tetramethylammonium hydroxide (containing 0.12 mol of methanol and 15.9 mmol of tetramethylammonium hydroxide), 14.50 g (0.8 mmol) of water, and 14.60 g of 1-propanol. The raw material liquid (V2) was added dropwise to the raw material liquid (V1) at a constant rate over 30 minutes using a dropping funnel while keeping the temperature of the reaction system at 60° C.±10° C. After the addition of the raw material liquid (V2), the reaction mixture was stirred at 60° C., and the reaction was terminated when 2 hours had elapsed.

Subsequently, 3.74 g (8.3 mmol) of a methanol solution of 20% by mass of oxalic acid was added to the reaction liquid to effect neutralization. The solvent including methanol, 1-propanol, water, and the like was then partially evaporated from the neutralized solution at 30° C. or lower under reduced pressure. 25 g of propylene glycol monomethyl ether acetate (PGMEA) and 40 g of a saturated sodium chloride solution were added to the resulting concentrate, and the mixture was stirred. When the stirring was stopped, the liquid contained in the flask promptly was separated into two layers and the layers were clearly separated at the interface. After that, the water layer (lower layer) was discharged and 40 g of a saturated sodium chloride solution was added again. The mixture was stirred, and the water layer was discharged. The above operation was repeated six times (washing process). According to the process, salts and excess acids contained in the concentrate were removed. After that, 1.5 mg of the above polymerization inhibitor was added to the oil layer mainly containing the polysiloxane (D3) and PGMEA. The resulting mixture was heated under reduced pressure to evaporate part of the solvent. Salts and the like that precipitated were filtered off to obtain a transparent light yellow polymer solution of a reactive polysiloxane (D3). 0.6 g of the polymer solution was evaporated to dryness at 100° C. for 1 hour. The solid content in the polymer solution was calculated from the weight of the dry substance, and found to be 54.7% by mass. The yield of the polysiloxane (D3) based on the solid content was 24.01 g.

Mn of the reactive polysiloxane (D3) was 15,000. The content of a residual alkoxy group (i.e., 1-propoxy group bonded to the silicon atom) in the reactive polysiloxane (D3) calculated from $^1$H-NMR chart was an amount corresponding to 3.7% with respect to the total content of alkoxy groups contained in the raw materials.

Comparative Example 4

Synthesis of a reactive polysiloxane was tried in the same manner as those in Comparative Example 3, except that the dropwise addition time of the raw material liquid (V2) containing a methanol solution of 25% by mass of tetramethylammonium hydroxide, water, and 1-propanol was changed to 60 minutes. Gelation was occurred in the reaction liquid during the dropwise addition of the raw material liquid (V2).

Table 1 shows the composition of the raw material liquids (V1) and (V2) used in Examples 1 to 7 and Comparative Examples 1 to 4. In Table 1, "Yes" indicates that the corresponding raw materials were contained in the raw material liquid (V1) or (V2), and "Neutralized" indicates that the basic catalyst contained in the Q monomer solution was neutralized before the T monomer and the Q monomer were mixed (see the raw material liquid (V1) of Comparative Example 2).

Table 2 shows the reaction conditions employed in the condensation process, the number average molecular weight (Mn) of the reactive polysiloxane, and the like.

Since the organosilicon compound (S1) was not added to the silicon compound (S2) in Comparative Examples 1 to 4, the addition rate of the raw material liquid (V2) (i.e., the molar ratio of the silicon compound (S2) to the organosilicon compound (S1) per unit time) is omitted in Table 2. The reaction temperature and the reaction time respectively refer to the temperature of the reaction mixture and the stirring time during a period after completion of the addition of the raw material liquid (V2) to the timing immediately before neutralization was effected.

TABLE 1

| | Composition of raw material liquid (V1) with which reactor was charged | | | | | Composition of raw material liquid (V2) added to reactor | | | | |
|---|---|---|---|---|---|---|---|---|---|---|
| | Organosilicon compound (S1) (T monomer) | Organosilicon compound (S2) (Q monomer) | Catalyst | Water | Alcohol | Organosilicon compound (S1) (T monomer) | Organosilicon compound (S2) (Q monomer) | Catalyst | Water | Alcohol |
| Example 1 | Yes | | | Yes | Yes | | Q1 | Yes | Yes | Yes |
| Example 2 | Yes | | | Yes | Yes | | Q1 | Yes | Yes | Yes |
| Example 3 | Yes | | | Yes | Yes | | Q1 | Yes | Yes | Yes |
| Example 4 | Yes | | | Yes | Yes | | Q1 | Yes | Yes | Yes |
| Example 5 | Yes | | | Yes | Yes | | Q1 | Yes | Yes | Yes |
| Example 6 | Yes | | | Yes | Yes | | Q2 | Yes | Yes | Yes |
| Example 7 | Yes | | | Yes | Yes | | Q3 | Yes | Yes | Yes |
| Comparative Example 1 | | Q1 | Yes | Yes | | Yes | | | Yes | Yes |
| Comparative Example 2 | Yes | Q4 | Yes | Neutralized | Yes | | | | Yes | Yes |
| Comparative Example 3 | Yes | Q5 | Yes | | Yes | | | | Yes | Yes |
| Comparative Example 4 | Yes | Q5 | Yes | | Yes | | | | Yes | Yes |

TABLE 2

| | Ratio of amount of organosilicon compound (S2) to organosilicon compound (S1) (molar ratio A) (S2)/(S1) | Addition rate of mixture (V2) (molar ratio A per unit time) (/min) | Reaction temperature (° C.) | Reaction time (hr) | Gelation during condensation process | Reactive polysiloxane | | |
|---|---|---|---|---|---|---|---|---|
| | | | | | | Type | Mn | Content of residual alkoxy groups (%) |
| Example 1 | 1.25 | 0.04 | 60 | 2 | No | C1 | 10,000 | 1.7 |
| Example 2 | 1.25 | 0.02 | 60 | 2 | No | C2 | 13,000 | 2.5 |
| Example 3 | 1.25 | 0.2 | 60 | 2 | No | C3 | 11,000 | 2.3 |
| Example 4 | 1.25 | 0.04 | 80 | 2 | No | C4 | 11,000 | 1.8 |
| Example 5 | 1.25 | 0.04 | 30 | 2 | No | C5 | 16,000 | 3.3 |
| Example 6 | 0.3 | 0.04 | 60 | 2 | No | C6 | 5,000 | 1.6 |
| Example 7 | 1.8 | 0.04 | 60 | 2 | No | C7 | 18,000 | 3.6 |
| Comparative Example 1 | 1.25 | — | 60 | — | Gelation occurred during reaction | — | — | — |
| Comparative Example 2 | 1.25 | — | 60 | 2 | No | D2 | 14,000 | 3.5 |
| Comparative Example 3 | 1.25 | — | 60 | 2 | No | D3 | 15,000 | 3.7 |
| Comparative Example 4 | 1.25 | — | 60 | | Gelation occurred during reaction | — | — | — |

The storage stability of the reactive polysiloxanes obtained in examples except Comparative Examples 1 and 4 was evaluated by the following method.

A polymer solution having a reactive polysiloxane content (solid content) of 40% by mass was prepared using a mixed solvent of propylene glycol monomethyl ether acetate and propylene glycol monomethyl ether (mass ratio: 4:1), and the storage stability of the reactive polysiloxane was evaluated using the prepared polymer solution.

A sample bottle (50 ml) was charged with 20 g of the polymer solution having a solid content of 40% by mass, and then sealed. The sample bottle was kept in a thermostat bath (60° C.). The sample bottle was shaken every 24 hours, and observed with the naked eye. It was determined that gelation had not occurred when the solution flowed swiftly when the sample bottle was turned upside down. It was determined that gelation had occurred when the solution did not flow when the sample bottle was turned upside down. The above evaluation was performed for 7 days, and the number of days until gelation was observed was recorded. When gelation was not observed on the seventh day, the storage stability evaluation test was terminated. The ratio of the viscosity on the seventh day to the viscosity before the storage stability evaluation test was calculated for the polymer solution for which gelation was not observed, to evaluate the storage stability. More specifically, the rotational viscosity at 25° C. was measured using an EDH viscometer (cone radius: 2.4 mm, cone angle: 1.34°). The calculated viscosity ratio is shown in Table 3. A change in viscosity was not observed when the viscosity ratio was 1. A viscosity ratio closer to 1 indicates better storage stability.

TABLE 3

| | Storage stability of polysiloxane (viscosity ratio) |
|---|---|
| Example 1 | 1.0 |
| Example 2 | 1.4 |
| Example 3 | 1.2 |
| Example 4 | 1.1 |
| Example 5 | 1.5 |
| Example 6 | 1.0 |
| Example 7 | 3.1 |

TABLE 3-continued

| | Storage stability of polysiloxane (viscosity ratio) |
|---|---|
| Comparative Example 1 | — |
| Comparative Example 2 | Gelation occurred within 6 days |
| Comparative Example 3 | Gelation occurred within 3 days |
| Comparative Example 4 | — |

As is clear from the results shown in Tables 2 and 3, since Examples 1 to 7 were ones of the present method in which the raw material liquid (V2) containing the silicon compound (S2) was added to the raw material liquid (V1) containing the organosilicon compound (S1), gelation did not occur during the reaction, and the reactive polysiloxane and the reactive polysiloxane solution exhibited excellent storage stability. In Comparative Example 1 in which the raw material liquid (V2) containing the organosilicon compound (S1) was added to the raw material liquid (V1) containing the silicon compound (S2), gelation occurred during the reaction, and a reactive polysiloxane could not be obtained. In Comparative Examples 2 and 3, gelation was not observed during the production of the polysiloxane, but was observed within 6 days and 3 days respectively after the preparation of the polysiloxane solution. Specifically, when the sample bottle was shaken on the sixth day or the third day, the polymer solution did not flow in the sample bottle due to gelation.

2. Evaluation of Curability of Reactive Polysiloxane

A curable composition was prepared using the polysiloxane obtained in Example, and the curability of the curable composition was evaluated by the following method.

3 parts by mass of 2-hydroxy-2-methyl-1-phenylpropan-1-one as a radical initiator was dissolved in 200 parts by mass of the polymer solution containing the reactive polysiloxane (C1) and having a solid content of 50% by mass to prepare a curable composition. The curable composition was applied to a polycarbonate plate using a bar coater. The resulting film was heated at a temperature of about 50° C. for 5 minutes to volatilize the solvent to form a film having a thickness of about 10 μm. The film was cured by applying UV rays under the following conditions using an illumination meter (manufactured by EIT). The tackiness of the surface was lost by applying UV rays once, and the curable composition exhibited excellent curability.

(UV Irradiation Conditions)
Lamp: 80 W/cm high-pressure mercury lamp
Lamp height: 10 cm
Cumulative dose: 210 mJ/cm² (UV-A region)
Atmosphere: air

INDUSTRIAL APPLICABILITY

The reactive polysiloxane produced by the present invention can be stored for a long time in a state in which the reactive polysiloxane is dissolved in an organic solvent. Therefore, a change in properties (quality) of the polysiloxane during storage, transportation, and the like can be suppressed. The reactive polysiloxane solution can be easily used, and is suitable as an industrial material. Since the reactive polysiloxane has a reactive group such as a (meth)acryloyl group, and leads to a curable composition or the like that is excellent in curability, the reactive polysiloxane has industrial advantages.

What is claimed is:

1. A method for producing a solvent-soluble reactive polysiloxane, the method comprising: subjecting a raw material having a siloxane bond-forming group to hydrolysis and copolycondensation in the presence of a catalyst to synthesize a reactive polysiloxane of formula (1),

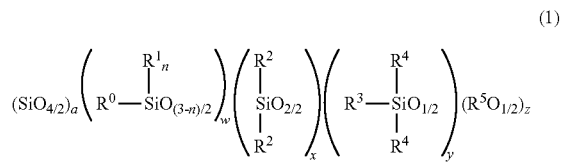

wherein $R^0$ is an organic group of formula (2),

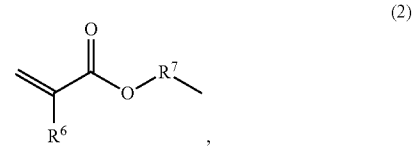

$R^1$ is an organic group comprising a functional group having 1 to 10 carbon atoms,
$R^2$, $R^3$, and $R^4$ are each independently a hydrogen atom or a hydrocarbon group having 1 to 10 carbon atoms,
$R^5$ is a hydrocarbon group having 1 to 6 carbon atoms,
$R^6$ is a hydrogen atom or a methyl group,
$R^7$ is an alkylene group having 1 to 6 carbon atoms,
n is 0 or 1,
a, w, x, y, and z are each independently a number of moles,
w is a positive number,
x, y, and z are each independently 0 or a positive number,
$0 \leq a/w \leq 1.8$,
$0 \leq x/(a+w) \leq 2$, $0 \leq y/(a+w) \leq 2$,
$0 \leq z/(a+w+x+y) \leq 1$, and,
the raw material comprises:
an organosilicon compound (S1) of formula (5),

wherein $R^{11}$ is a siloxane bond-forming group and $R^0$ and $R^1$ are as defined in formula (1);
and
a silicon compound (S2) selected from the group consisting of a tetraalkoxysilane and a tetrahalogenosilane,
wherein the organosilicon compound (S1) and the silicon compound (S2) have a molar ratio (S2)/(S1) of 1.8 or less,
the subjecting is conducted while gradually adding a mixture of the silicon compound (S2) and the catalyst to a raw material liquid comprising the organosilicon compound (S1) and water, and
the mixture of the silicon compound (S2) and the catalyst is added while keeping a molar ratio of an amount of the silicon compound (S2) to an amount of the organosilicon compound (S1) within 0.001/min to 0.3/min,
wherein when x is a positive number, said raw material further comprises a silane compound having two siloxane bond-forming groups and when y is a positive number, said raw material further comprises a silane compound having one siloxane bond-forming group.

2. The according to claim 1, wherein a reaction temperature in the subjecting is between 30° C. and 80° C.

3. The method according to claim 2, further comprising, after the subjecting, neutralizing a reaction liquid comprising the reactive polysiloxane to obtain a resulting reaction liquid,
concentrating the resulting reaction liquid,
mixing a resulting concentrate and an organic solvent for water washing,
dissolving the reactive polysiloxane in the organic solvent for water washing,
contacting a resulting organic solution with water,
removing a water layer from a mixed liquid, and
removing a medium from a collected oil layer.

4. The method according to claim 3,
wherein the organic solvent for water washing is at least one compound selected from the group consisting of propylene glycol monobutyl ether, 1-pentanol, 2-methyl-1-butanol, 1-octanol, and propylene glycol methyl ether acetate.

5. The method according to claim 1,
wherein the silicon compound (S2) in the subjecting is a tetraalkoxysilane, and the tetraalkoxysilane comprises a compound obtained by subjecting a tetraalkoxysilane to an alcohol exchange reaction with 1-propanol.

6. The method for producing a solvent-soluble reactive polysiloxane according to claim 5,
wherein a reaction temperature in said condensation process is between 30° C. and 80° C.

7. The method according to claim 5, further comprising, after the subjecting, neutralizing a reaction liquid comprising the reactive polysiloxane to obtain a resulting reaction liquid,
concentrating the resulting reaction liquid,
mixing a resulting concentrate and an organic solvent for water washing,
dissolving the reactive polysiloxane in the organic solvent for water washing,
contacting a resulting organic solution with water,
removing a water layer from a mixed liquid, and
removing a medium from a collected oil layer.

8. The method according to claim 7,
wherein the organic solvent for water washing is at least one compound selected from the group consisting of propylene glycol monobutyl ether, 1-pentanol, 2-methyl-1-butanol, 1-octanol, and propylene glycol methyl ether acetate.

9. The method according to claim 1, further comprising, after the subjecting, neutralizing a reaction liquid comprising the reactive polysiloxane to obtain a resulting reaction liquid,
concentrating the resulting reaction liquid,
mixing a resulting concentrate and an organic solvent for water washing,
dissolving the reactive polysiloxane in the organic solvent for water washing,
contacting a resulting organic solution with water,
removing a water layer from a mixed liquid, and
removing a medium from a collected oil layer.

10. The method according to claim 9,
wherein the organic solvent for water washing is at least one compound selected from the group consisting of propylene glycol monobutyl ether, 1-pentanol, 2-methyl-1-butanol, 1-octanol, and propylene glycol methyl ether acetate.

11. The method according to claim 1, wherein $R^1$ is at least one selected from the group consisting of an organic group comprising an alkyl group having 1 to 6 carbons, an organic group comprising an aralkyl group having 7 to 10 carbon atoms, and an organic group comprising an aryl group having 6 to 10 carbon atoms.

12. The method according to claim 1, wherein $0.3 \leq a/w \leq 1.8$.

13. The method according to claim 1, wherein $0.8 \leq a/w \leq 1.8$.

14. The method according to claim 1, wherein $1.0 \leq a/w \leq 1.8$.

15. The method according to claim 1, wherein $R^2$ is at least one selected from the group consisting of a methyl group and a phenyl group.

16. The method according to claim 1, wherein $R^3$ is at least one selected from the group consisting of a methyl group, an ethyl group, a propyl group, and a phenyl group.

17. The method according to claim 1, wherein $R^4$ is at least one selected from the group consisting of a methyl group, an ethyl group, and a propyl group.

18. The method according to claim 1, wherein $0 \leq y/(a+w) \leq 1$.

19. The method according to claim 1, wherein $0.01 \leq z/(a+w+x+y) \leq 0.5$.

20. The method according to claim 1, wherein the mixture of the silicon compound (S2) and the catalyst is added while keeping a molar ratio of an amount of the silicon compound (S2) to an amount of the organosilicon compound (S1) within 0.002/min to 0.2/min.

* * * * *